United States Patent
Hayashi

(10) Patent No.: US 7,185,553 B2
(45) Date of Patent: Mar. 6, 2007

(54) SCREW FEED APPARATUS

(75) Inventor: Eiji Hayashi, Kanagawa (JP)

(73) Assignee: NSK, Ltd., Tokyo (JP)

( * ) Notice: Subject to any disclaimer, the term of this patent is extended or adjusted under 35 U.S.C. 154(b) by 184 days.

(21) Appl. No.: 10/401,538

(22) Filed: Mar. 31, 2003

(65) Prior Publication Data

US 2003/0213323 A1 Nov. 20, 2003

(30) Foreign Application Priority Data

Mar. 29, 2002 (JP) .................... P. 2002-096769

(51) Int. Cl.
*F16H 25/20* (2006.01)
(52) U.S. Cl. .................. 74/424.86; 74/424.82
(58) Field of Classification Search ............ 74/424.86, 74/424.87, 424.88, 424.95
See application file for complete search history.

(56) References Cited

U.S. PATENT DOCUMENTS

| | | | | |
|---|---|---|---|---|
| 3,580,098 A | * | 5/1971 | Goad | 74/424.87 |
| 4,905,534 A | * | 3/1990 | Andonegui | 74/424.87 |
| 5,005,436 A | * | 4/1991 | Brusasco | 74/424.87 |
| 5,142,929 A | * | 9/1992 | Simpson, III | 74/424.87 |
| 5,154,091 A | * | 10/1992 | Bianco | 74/424.86 |
| 5,193,409 A | * | 3/1993 | Babinski | 74/424.83 |
| 5,555,770 A | * | 9/1996 | Dolata et al. | 74/424.86 |
| 5,988,007 A | * | 11/1999 | Nishimura | 74/424.87 |
| 6,561,053 B2 | * | 5/2003 | Greubel | 74/424.87 |
| 6,581,489 B2 | * | 6/2003 | Ohkubo | 74/424.86 |
| 6,681,651 B2 | * | 1/2004 | Fujita | 74/424.86 |
| 6,851,722 B2 | * | 2/2005 | Chiu et al. | 285/134.1 |

FOREIGN PATENT DOCUMENTS

DE 100 11 383 A1 9/2001

* cited by examiner

*Primary Examiner*—William C. Joyce
(74) *Attorney, Agent, or Firm*—Sughrue Mion, PLLC

(57) ABSTRACT

A screw feed apparatus has a screw shaft having a screw groove formed on the outer peripheral surface thereof; a nut having a screw groove formed on the inner peripheral surface thereof opposed to the outer peripheral surface of the screw shaft; a large number of rolling elements rollably interposed between the two screw grooves of the screw shaft and nut; a circulation path disposed in the nut for returning the rolling elements to their original positions; and, a deflector piece disposed in the nut for connecting the circulation path to a rolling path formed between the two screw grooves, wherein the deflector piece includes a plurality of divisional pieces respectively formed rolling element guide grooves cooperating together in forming a rolling element guide path for guiding the rolling elements to the circulation path.

13 Claims, 3 Drawing Sheets

SCREW FEED APPARATUS

BACKGROUND OF THE INVENTION

1. Field of the Invention

The present invention relates to a screw feed apparatus which is used as e.g. means for driving and feeding a work table disposed in a machine tool and, especially, to a screw feed apparatus of a rolling element circulation type.

2. Description of the Related Art

Conventionally, a ball screw of a tube circulation type, as shown in FIG. 6, comprises a screw shaft "a" having a ball screw groove "b" formed on the outer diameter surface thereof, and a nut "c" having a ball screw groove "d" formed on the inner diameter surface thereof opposed to the outer peripheral surface of the screw shaft; and, between the two ball screw grooves "b" and "d" of the screw shaft "a" and nut "c", there are interposed a large number of balls "e" in such a manner that they are able to roll. Also, in the ball screw of this type, on the exterior of the nut "c", there is disposed a return tube "f" which is used to form a return path for the balls "e". Thus, the balls "e", which have rolled between the two ball screw grooves "b" and "d" with the rotational movement of the screw shaft "a", are able to move back to their original positions through the return path formed in the return tube "f".

According to the ball screw of this type, in the two end portions of the return tube "f", there are disposed tongue piece portions "g"; and, the balls "e", which have rolled between the two ball screw grooves "b" and "d", are made to collide with the tongue piece portions and are scooped up into the return tube "f". Therefore, due to collision of the balls "e" with the tongue piece portions "g", not only there are generated noises but also the balls "e" can be damaged.

In view of the above, as shown in FIG. 7, there is proposed and known a ball screw structured in the following manner: that is, in the interior of the nut, there are disposed a plurality of deflector pieces "h" for connecting together a return path formed in the interior of the return tube "f" and a ball rolling path formed between the two ball screw grooves "b" and "d"; and, in each of the deflector pieces "h", there is formed a ball guide path "i" which can scoop up the balls "e" at an angle substantially coincident with the lead angle of the ball screw grooves "b" and "d" to guide the balls "e" into the return tube "f".

In the above-mentioned conventional ball screw, since the balls "e" having rolled between the two ball screw grooves "b" and "d" are scooped up at an angle substantially coincident with the lead angle of the ball screw grooves "b", "d" by the ball guide paths "i" respectively formed in the deflector pieces "h" and are then guided into the return tube "f", generation of noises and damage of the balls can be prevented. However, because the ball guide paths "i" are complicated in shape and thus formation of the complicated ball guide paths "i" is difficult, there arises a problem that the manufacturing cost of the ball guide paths increases.

SUMMARY OF THE INVENTION

The present invention aims at eliminating the above drawbacks found in the conventional ball screws. Accordingly, it is an object of the present invention to provide a screw feed apparatus which can reduce the cost necessary for formation of a rolling element guide path which is used to scoop up the balls at an angle substantially coincident with the lead angle of the ball screw grooves to guide them into the return tube. Also, it is another object of the present invention to provide a screw feed apparatus which not only can facilitate the formation of a complicated rolling element guide path including a rolling element scoop-up portion but also allows a partial change in the design thereof and can be formed by molding.

In attaining the above objects, according to a first aspect of the present invention, there is provided a screw feed apparatus having a screw shaft having a screw groove formed on the outer peripheral surface thereof; a nut having a screw groove formed on the inner peripheral surface thereof opposed to the outer peripheral surface of the screw shaft; a large number of rolling elements rollably interposed between the two screw grooves of the screw shaft and nut; a circulation path disposed in the nut for returning the rolling elements to their original positions; and, a deflector piece disposed in the nut for connecting the circulation path to a rolling path formed between the two screw grooves, wherein the deflector piece includes a plurality of divisional pieces respectively formed rolling element guide grooves cooperating together in forming a rolling element guide path for guiding the rolling elements to the circulation path.

According to the present structure, since the rolling element guide path can be formed easily in the interior of the deflector piece, the cost necessary for formation of the rolling element guide path can be reduced.

In a screw feed apparatus according to the present invention, as in the present invention according to a second aspect of the present invention, preferably, each of the divisional pieces may have a projection portion or a hole portion for positioning each other. With use of such structure, the rolling element guide path can be formed in the interior of the deflector piece with high accuracy, thereby being able to prevent the rolling elements from being caught or clogged in the guide path. Also, as in the present invention according to a third aspect of the present invention, each of the deflector pieces may be formed of sintered material, resin material, or composite material composed of metal and resin. With use of such deflector piece, the deflector pieces can be formed by molding, which makes it possible to mass-produce the deflector pieces at low costs. Further, in case where the deflector pieces are formed of resin, noises can be reduced; and, in the case of the sintered material, adjustments for the specific gravity balance of the nut are possible. Especially, adjustments for the rotation balance of the nut in the high-speed rotation are possible. In the case of the composite material composed of metal and resin, there can be obtained a deflector piece which has both of the above-mentioned advantages.

In the above construction, it is preferable that the deflector piece may include a tongue portion for scooping up the rolling elements from the screw grooves, and the deflector piece is formed so as to have a shape following the circulation path.

DETAILED DESCRIPTION OF THE PREFERRED EMBODIMENTS

Now, description will be given below of an embodiment of a screw feed apparatus according to the present invention with reference to the accompanying drawings.

Figure 1:
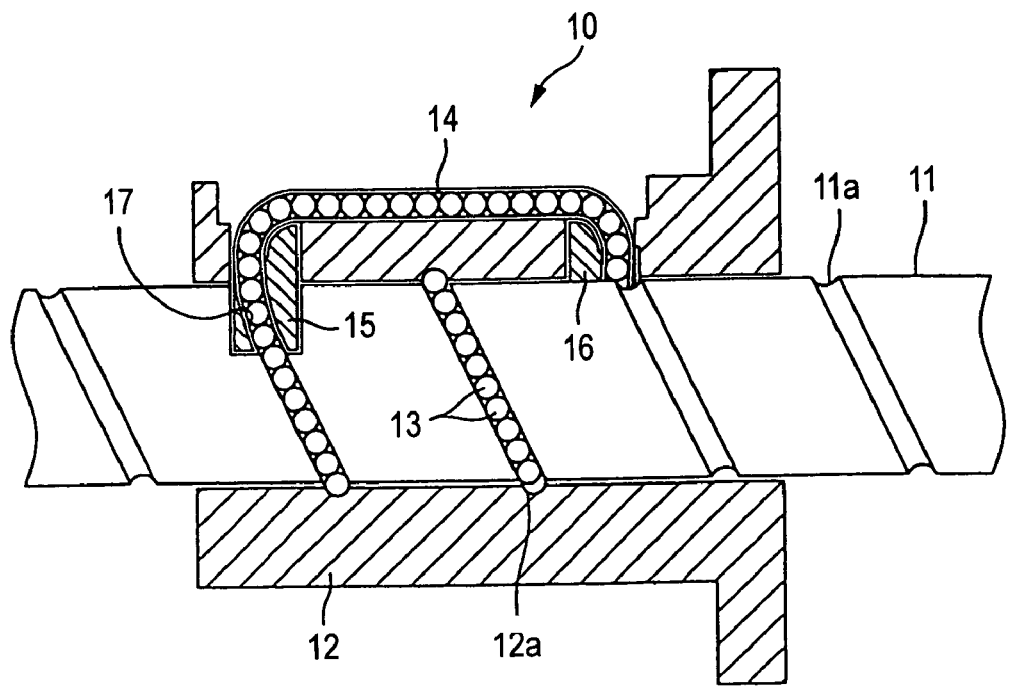
FIG. 1 is a section view of a ball screw according to an embodiment of the present invention, taken along the axial direction thereof.
Figure 2:
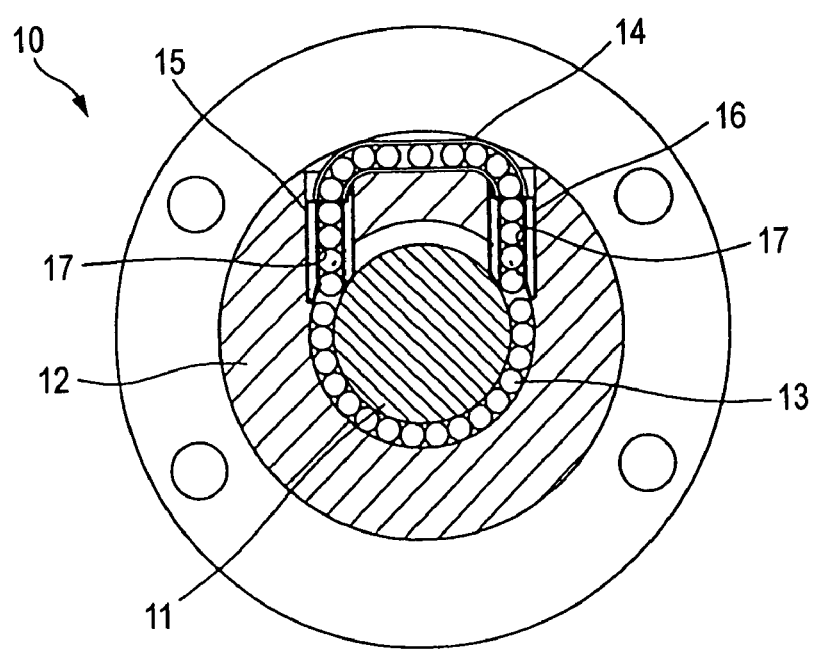
FIG. 2 is a section view of the ball screw shown in FIG. 1, taken along the diameter direction thereof.

FIGS. 1 to 5 show an embodiment of a screw feed apparatus according to the present invention. In FIG. 1, a ball screw 10 according to the present embodiment comprises a screw shaft 11 having a spiral-shaped ball screw groove 11a formed on the outer peripheral surface thereof and a nut 12 having a spiral-shaped ball screw groove 12a formed on the inner peripheral surface thereof; and, between the two ball screw grooves 11a and 12a of the screw shaft 11 and nut 12, there are rollably interposed a large number of balls 13.

Also, the ball screw 10 further comprises a return tube 14 which is disposed on the exterior of the nut 12 and is used to form a return path for the balls 14; and, in the nut 12, there are incorporated deflector pieces 15, 16 at their respective given positions, while the deflector pieces 15, 16 are used to connect together the return path formed in the interior of the return tube 14 and a ball rolling path formed between the two ball screw grooves 11a, 12a.

The deflector pieces 15, 16 are formed of sintered material or resin material by molding, while they can also be formed of metal like normal deflector pieces. In each of the deflector pieces 15, 16, there is formed a ball guide path 17 (see FIG. 1) which can be used to scoop up the balls 13 at an angle substantially coincident with the lead angle of the ball screw grooves 11a, 12a to thereby guide them into the return tube 14. Also, each of the deflector pieces 15, 16 includes a tongue portion 18 (see FIGS. 3 and 4) which is used to scoop up the balls 13 from the ball screw grooves 11a, 12a. The balls 13 scooped up by the tongue portions 18 are to be fed to the return tube 14 through the ball guide path 17 formed in each of the deflector pieces 15, 16.

Figure 3:
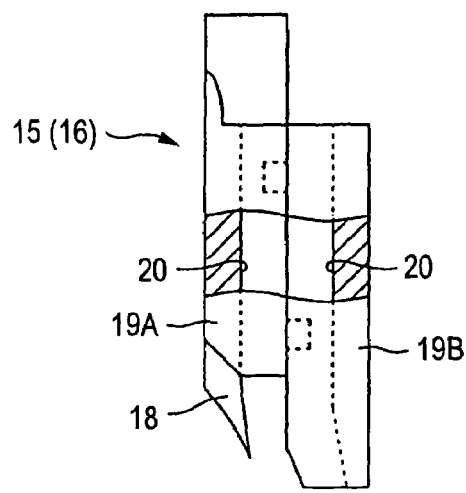
FIG. 3 is a side view of a deflector piece shown in FIG. 2.
Figure 4A:
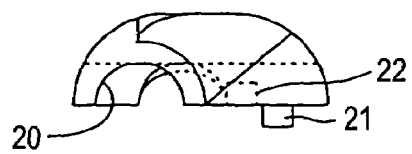
FIG. 4A is a plan view of one of divisional pieces constituting a deflector piece.
Figure 5A:
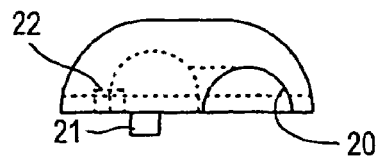
FIG. 5A is a plan view of the other of the divisional pieces constituting the deflector piece.
Figure 4B:
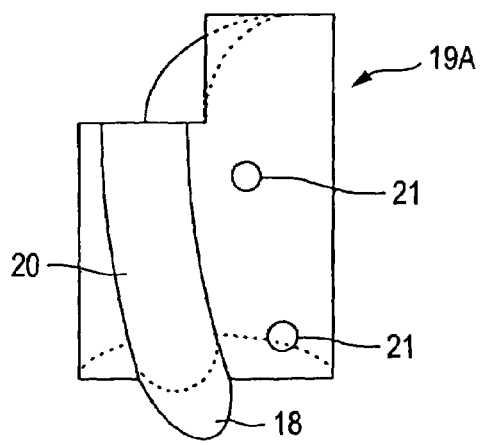
FIG. 4B is a front view thereof.
Figure 5B:
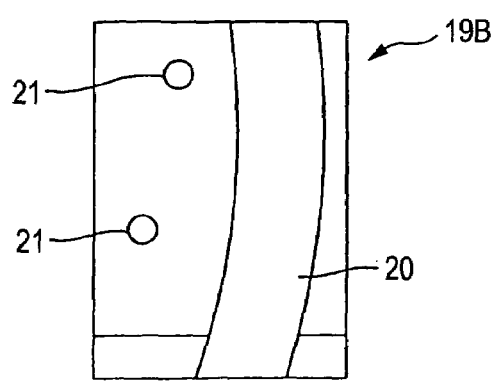
FIG. 5B is a front view thereof.
Figure 6:
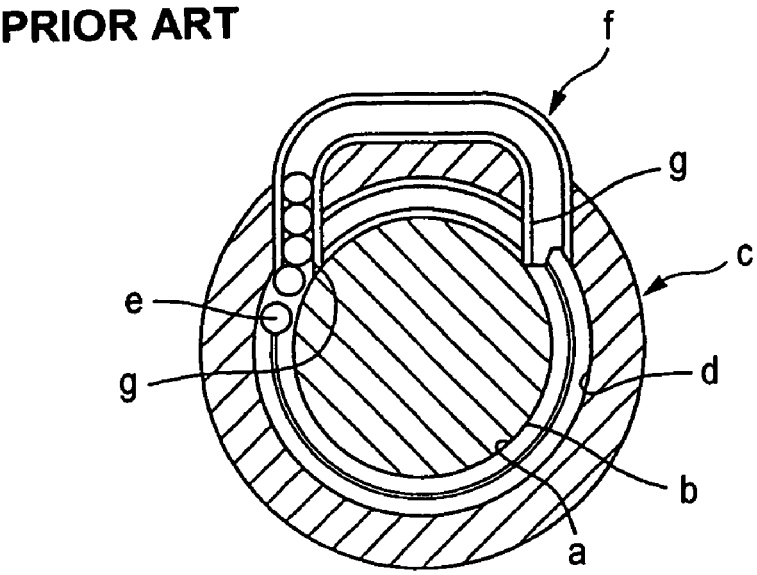
FIG. 6 is a section view of a first conventional ball screw; k.

Also, each of the deflector pieces 15, 16 is composed of two divisional pieces 19A, 19B (see FIG. 3). In each of the divisional pieces 19A, 19B, as shown in FIGS. 4 and 5, not only there is formed a ball guide groove 20 for forming the ball guide path 17 but also there are disposed projection portions 21 and a hole 22 for positioning so as to be opposed to each other.

In case where each of the deflector pieces 15, 16 is composed of two divisional pieces 19A, 19B and, in each of the divisional pieces 19A, 19B, there is formed the ball guide groove 20 for forming the ball guide path 17 in this manner, when compared with the previously described conventional structure, formation of the ball guide paths 17 in the deflector pieces 15, 16 can be facilitated, which makes it possible to reduce the forming cost of the ball guide paths 17.

And, in the above embodiment, since, in each of the deflector pieces 15, 16, the projection portions 21 and hole portion 22 for positioning are disposed opposed to each other, the positions of the divisional pieces 19A, 19B can be prevented from shifting, so that the ball guide paths 17 can be formed in the deflector pieces 15, 16 with high accuracy and thus the balls 13 can be prevented from being caught or clogged in the ball guide paths 17.

Figure 7:
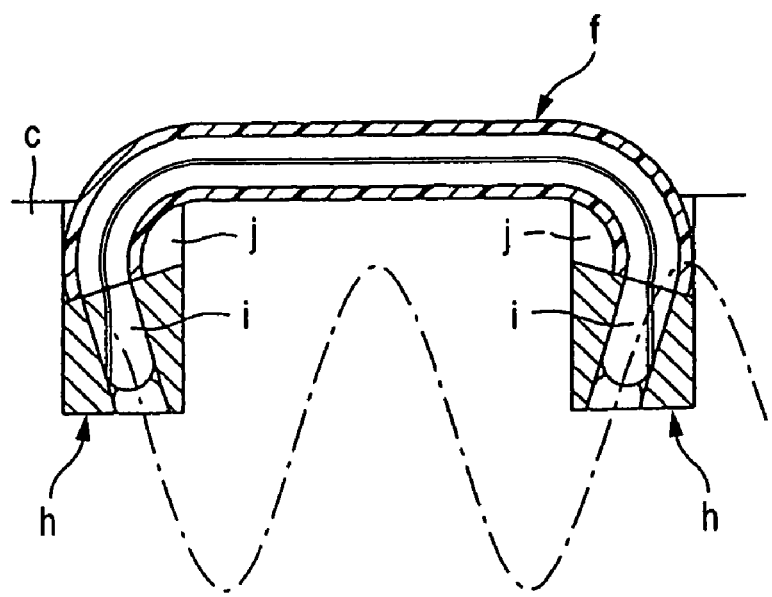
FIG. 7 is a section view of a second conventional ball screw.

Also, because the deflector pieces 15, 16 can be formed so as to have a shape following the tube using the easily workable material property thereof, there is eliminated the fear as in the conventional structure that such clearances j as shown in FIG. 7 can be generated in the nut; and, therefore, the stability of the return tube 14 can be enhanced. Further, since each of the deflector pieces 15, 16 is formed of the divisional pieces 19A, 19B, the angle of scoop-up of the balls 13 can be made to be substantially coincident with the lead angle of the ball screw grooves 11a, 12a, which makes it possible to prevent the balls 13 from colliding with the tongue portions 18 of the deflector pieces 15, 16, thereby being able to restrict generation of noises and vibrations. Also, in case where the deflector pieces 15, 16 are disposed at arbitrary positions in the interior of the nut 12 which provides the end terminal of a circuit, the number of circuits can be set equivalently to a conventional ball screw of a tube circulation type.

By the way, in the above embodiment, each of the deflector pieces 15, 16 is composed of two divisional pieces 19A, 19B; however, for example, each deflector piece may also be composed of three or more divisional pieces. Also, by applying the present invention to a ball screw in which hold pieces are respectively interposed between mutually adjoining balls, the hold pieces can be prevented from being caught in the scoop-up portions. Here, the hold piece may also be formed of two or more hold pieces connected together.

Also, in the above embodiment, there is illustrated a case in which the present invention is applied to a ball screw; however, the present invention is not limited to this but, for example, the present invention can also be applied to a roller screw using a roller as a rolling element.

As has been described heretofore, according to the screw feed apparatus of the present invention, since it is possible to facilitate the formation of the rolling element guide path for scooping up the rolling elements at an angle substantially coincident with the lead angle of the screw grooves to guide them into the circulation path, the cost necessary for formation of the rolling element guide path can be reduced.

What is claimed is:

1. A screw feed apparatus comprising:
    a screw shaft having a screw groove formed in the outside diameter surface thereof;
    a nut having a screw groove formed in the inside diameter surface thereof opposed to said outside diameter surface of said screw shaft;
    a number of rolling bodies rollably interposed between said two screw grooves of said screw shaft and nut;
    a circulation passage that is disposed on an exterior of said nut, returns said rolling bodies to the nut and has flection portions at both ends thereof; and,
    deflector pieces formed separate from the circulation passage and disposed in said nut for connecting said circulation passage to a rolling passage formed between said two screw grooves,
    wherein each of said deflector pieces comprises a plurality of divisional pieces and, in said divisional pieces, there are respectively formed rolling body guide grooves cooperating together in forming a rolling body guide passage for guiding said rolling bodies to said circulation passage, and
    a projection portion and a hole portion are formed on each of the divisional pieces of each of the deflector pieces so that the projection portion of one of the divisional pieces fits in the hole portion of an adjacent one of the divisional pieces to thereby integrate the divisional pieces of respective deflector pieces.

2. The screw feed apparatus according to claim 1, wherein each of the deflector pieces is formed of sintered material, resin material, or composite material composed of metal and resin.

3. The screw feed apparatus according to claim 1, wherein each of the deflector pieces includes a tongue portion for scooping up the rolling elements from the screw grooves.

4. The screw feed apparatus according to claim 1, wherein each of the deflector pieces is formed so as to have a shape following the circulation path.

5. The screw feed apparatus according to claim 1, wherein the circulation passage comprises a return tube that is disposed on an outer surface of the nut.

6. The screw feed apparatus according to claim 1, wherein the circulation passage is formed as a tube member disposed on an exterior of the nut.

7. The screw feed apparatus according to claim 1, wherein the flection portions are integrally formed with the circulation passage.

8. The screw feed apparatus according to claim 1, wherein the flection portions abut on respective ones of the deflector pieces.

9. A screw feed apparatus, comprising:
a screw shaft having a screw groove formed in the outside diameter surface thereof;
a nut having a screw groove formed in the inside diameter surface thereof opposed to said outside diameter surface of said screw shaft;
a number of rolling bodies rollably interposed between said two screw grooves of said screw shaft and nut;
a circulation passage that is disposed on an exterior of said nut, returns said rolling bodies to the nut and has flection portions at both ends thereof; and,
deflector pieces formed separate from the circulation passage and disposed in said nut for connecting said circulation passage to a rolling passage formed between said two screw grooves,
wherein each of said deflector pieces is composed of a plurality of divisional pieces, and in said divisional pieces there are respectively formed rolling body guide grooves cooperating together in forming a rolling body guide passage for guiding said rolling bodies to said circulation passage.

10. The screw feed apparatus according to claim 9, wherein
the flection portions fit in ends of the rolling body guide grooves to form fitting portions of the deflector pieces, and
an inclination angle of the fitting portions and an inclination angle of the flection portions are substantially the same.

11. The screw feed apparatus according to claim 9, wherein the circulation passage comprises a return tube that is disposed on an outer surface of the nut.

12. A screw feed apparatus, comprising:
a screw shaft having a screw groove formed in the outside diameter surface thereof;
a nut having a screw groove formed in the inside diameter surface thereof opposed to said outside diameter surface of said screw shaft;
a number of rolling bodies rollably interposed between said two screw grooves of said screw shaft and nut;
a circulation passage that is disposed on an exterior of said nut for returning said rolling bodies to their original positions and having flection portions at both ends thereof; and,
deflector pieces formed separate from the circulation passage and disposed in said nut for connecting said circulation passage to a rolling passage formed between said two screw grooves,
wherein each of said deflector pieces is composed of a plurality of divisional pieces, and in said divisional pieces there are respectively formed rolling body guide grooves cooperating together in forming a rolling body guide passage for guiding said rolling bodies to said circulation passage, and
an inclination angle of an end portion of the rolling body guide groove of each of the deflector pieces is substantially the same as a lead angle of the screw shaft.

13. The screw feed apparatus according to claim 12, wherein the circulation passage comprises a return tube that is disposed on an outer surface of the nut.

* * * * *